Dec. 18, 1951     F. W. SCHWINN     2,579,097
APPARATUS FOR BRAZING
Filed June 11, 1948
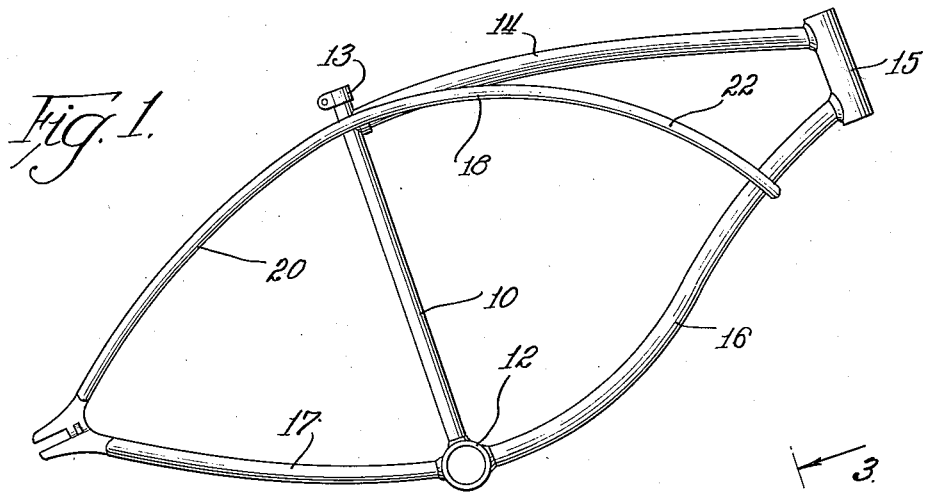
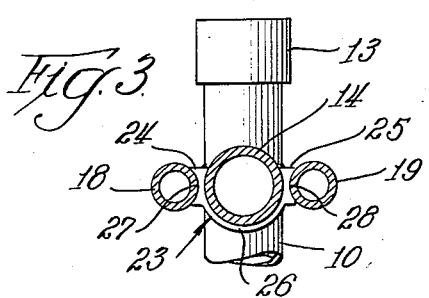
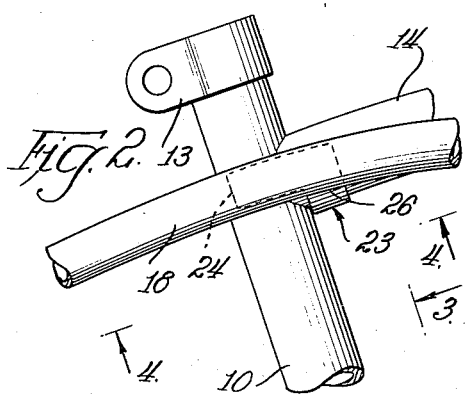
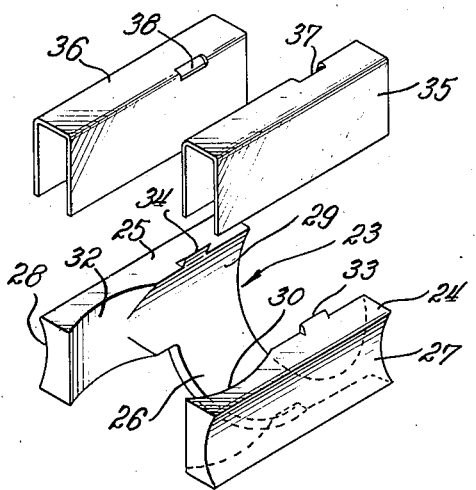
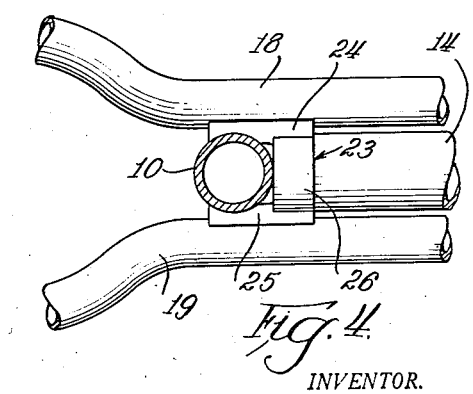
INVENTOR.
Frank W. Schwinn
BY Albert G. McCaleb
atty.

Patented Dec. 18, 1951

2,579,097

UNITED STATES PATENT OFFICE 2,579,097

APPARATUS FOR BRAZING

Frank W. Schwinn, Chicago, Ill.

Application June 11, 1948, Serial No. 32,500

2 Claims. (Cl. 287—54)

This invention relates to a method and apparatus for brazing which have particular application to the brazing of joints between parts having surface contours such that the normal area or areas of contact of adjacent surfaces are small.

One of the objects of my invention is to provide a method and apparatus adapted to the production of strong and durable brazed joints between parts having normally uncomplementary adjacent surfaces.

Another object of this invention is to provide a method and apparatus suited to high frequency induction brazing processes for simultaneously effecting the brazing of joints between the surfaces of a plurality of transversely disposed parts having non-complementarily curved external contours.

My invention also has within its purview the provision of a method and apparatus of the class referred to and by which the brazing metal is held in place with respect to the joint surfaces preparatory to, and during the brazing operation.

Considered structurally, the invention comprehends the provision of a metallic insert with surface portions shaped to fit adjacent parts of the members which are to be joined, so that the brazed joints are enlarged and strengthened by their being established between said members and the fitting surface portions of the insert.

In complement to the proceeding structural provision of the invention, I have further comprehended that for certain adaptations the said insert may be made in a form to grip at least one of the members, so as to assist in the retention of the parts in their assembled relationship during the brazing.

In further correlation to the preceding structural objects, my invention also has within its purview the provision of pieces of brazing metal formed to be retained in position relative to the joint surfaces until the brazing is accomplished.

Considered in respect to a specific adaptation, this invention provides a method and apparatus for effecting a strong and secure brazed joint between the side surfaces of a plurality of bicycle frame tubes.

My method includes the step of inserting a steel insert which is contoured for fitting, as by coining, between the surfaces of the parts which are to be brazed.

Other objects and advantages of the invention will be apparent from the following description and the accompanying drawings in which similar characters of reference indicate similar parts throughout the several views.

Referring to the one sheet of drawings:

Fig. 1 is a side elevational view of a bicycle frame of a type embodying a joint to which a preferred form of my method and apparatus are well adapted and which adaptation serves as an exemplary disclosure of this invention;

Fig. 2 is a fragmentary side elevation view of a portion of the frame structure shown in Fig. 1, drawn to a considerably larger scale, better to illustrate the portion of the bicycle frame structure to which the method and apparatus of my invention are applied for illustrative purposes;

Fig. 3 is a fragmentary sectional view taken substantially on a line 3—3 of Fig. 2 and viewed in the direction indicated by the accompanying arrows;

Fig. 4 is a fragmentary sectional view wherein the section is taken substantially on a line 4—4 of Fig. 2 and viewed as indicated by the arrows; and Fig. 5 is an exploded perspective view of parts utilized in the joint of Figs. 1 to 4 inclusive and which, when utilized, follow a preferred adaptation of my disclosed method.

Although there are many adaptations in which brazed joints might well be utilized for securing together non-conforming or non-complementarily curved surfaces of metal parts and both my method and apparatus may be suited by variations to such uses, I have selected for illustrative and exemplary purposes a cluster joint between tubes of a bicycle frame structure.

Having reference to Fig. 1, the illustrative frame therein depicted includes a seat post mast 10 secured to and extending upwardly from a crank hanger 12 and having at its upper end a seat post clamp 13. Secured to and extending forwardly from the upper portion of the seat post mast 10 and in substantially coplanar relationship therewith is an upper reach tube 14, one end of which is disposed in substantially abutting relationship to one side surface of the seat post mast. At its other end, the upper reach tube 14 is secured to a steering head 15. A lower reach tube 16 extends between and has its opposite ends secured to the crank hanger 12 and the steering head 15. Extending from the crank hanger 12 in a direction substantially opposed to the lower reach tube 16 is a rear fork 17.

As depicted in Figs. 1 to 4 inclusive, substantially coextensive and parallel side tubes 18 and 19 are disposed on and across opposite sides of the joint between the seat post mast 10 and upper reach tube 14. The opposite end portions of the said tubes 18 and 19 are curved to provide upper stays 20 for the rear fork and forward braces 22. At their ends, the upper stays 20 are secured to the ends of the rear fork 17. At their other ends, the forward braces are secured to opposite sides of the lower reach tube 16.

For rigidifying the frame structure, it is desirable to provide a strong and durable joint for securing each of the side tubes 18 and 19 to the adjacent side surfaces of the upper reach tube 14 and seat post mast 10. In this instance as is often the case, the adjacent surfaces of the parts between which the joints are desired are non-complementarily curved, so that their normal areas of surface contact are extremely small. For effecting the formation of rugged brazed joints, contacting surface areas of appreciable size desirable. Furthermore, for producing brazed joints by methods such as that of using high frequency induction apparatus for producing the heat for the brazing, it is preferable that the parts embodied in the joint shall hold together while the heating is effected.

For the purpose of obtaining rugged brazed joints having substantial surface areas between the opposed surfaces of each of the seat post mast and upper reach tubes and the surfaces of the side tubes 18 and 19, I have provided a metal insert 23, preferably of coined steel, which, in the present instance, is made in the form of a clip having side portion 24 and 25 which fit between the adjacent tube surfaces and an integral connecting portion 26 which connects the side portions and aids in holding the insert in place during the brazing operation. As shown in Fig. 5, the clip-type metal insert for the disclosed joint structure has surfaces shaped to conform to the adjacent tube members so as to provide substantial surface areas of contact, whereby each tube is strongly secured by brazing to an adjacent and conforming surface of the insert.

Concavely curved outer side surfaces 27 and 28 of the side portions 24 and 25 are shaped to conform to the adjacent inner surfaces of the side tubes 18 and 19 respectively. Internally of the clip-type insert, a partially cylindrical surface 29 is formed at one end of the insert by portions of the inner surfaces of the side portions 24 and 25 and the inner surface of the connecting portion 26. This partially cylindrical surface, in the present instance, fits against and conforms to the surface of the upper reach tube 14 adjacent the seat post mast 10. Extended ends of the side portions 24 and 25 provide inner concave surfaces 30 and 32 respectively which conform to the outer side surfaces of the seat post mast 10. For extending the gripping surface which embraces the upper reach tube 14, it is my preference to provide integrally formed and projecting lugged portions 33 and 34 in opposed relationship on the side portions 24 and 25 respectively of the insert and extending away from the connecting portion 26 on those side portions.

In addition to the desirability of maintaining the position of the clip-type insert during the brazing operation, which function, in the present instance, is accomplished by the clip-like formation and shaped surfaces of the insert, it is also desirable that the brazing metal, such as brass or bronze, shall be held in position for effecting strongly brazed joints when the parts are heated. For this purpose, I have provided preformed channel-type brazing metal parts 35 and 36 made of relatively thin sheet stock and bent to fit over the opposed curved surfaces of the insert side portions 24 and 25. For the accommodation of the projecting lug portions 33 and 34 on the side portions 24 and 25, openings 37 and 38 respectively are provided in the brazing metal parts.

In the assembly of the elements prior to the application of heat for effecting the brazing, the channel-type brazing metal parts 35 and 36 are placed upon the opposite side portions 24 and 25 of the insert, as indicated in the exploded view of Fig. 5. The insert is then preferably pressed onto the seat post mast tube 10 and then brought into embracing relationship with the upper reach tube 14, so that the side portions 24 and 25 are effectively inserted between the adjoined seat post mast 10 and upper reach tube 14 and the inner surfaces of the side tubes 18 and 19. When thus applied, the brazing material on the inner and outer surfaces of the insert side portions is conformed to the adjacent tube and insert surfaces while being held in close contact therewith. Thus, when the assembled parts are heated sufficiently by the high frequency induction method or otherwise, rugged brazed joints having substantial surface areas are produced.

Since parts, such as tubes and other exteriorly contoured members may be produced with consistency in production, but are rather difficult to deform with consistency and without considerable expense, the use of my disclosed method and apparatus, including the metal insert, have definite and material manufacturing advantages from the standpoints of both production cost and consistency. Strong and rugged joints are consistently produced in production by my disclosed method and apparatus since the inserts can be very readily produced with consistency to fit the parts which are to be joined and further, because the present material is consistently held in its proper position and may be subjected to uniform heating treatment. It is to be understood in the consideration of this invention that brazing and welding are deemed to be quite equivalent, and that the adaptation of my method and apparatus which include the use of a formed insert between the parts to be joined and conforming to the surface of the adjacent parts are adaptable for either brazing or welding process, as those terms are used in their more limited sense.

From the foregoing description and reference to the accompanying drawings, it may be readily appreciated that I have provided a method and apparatus which, although illustratively disclosed in a particular application, are applicable to many adaptations in which parts having normally non-conforming or non-uniformly curved surfaces are to be securely held together by brazing, welding, or the like. As has also been pointed out, my method and apparatus are adapted to the provision of consistent results in production at reasonable cost.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an elongated and strengthened brazed joint connecting the side surfaces of a plurality of non-complementarily shaped members including an intermediate member and spaced parallel and longitudinally extending side members on opposite sides of the intermediate member, the combination comprising a coined steel clip having side portions conforming to and embracing opposite side surfaces of the intermediate member, said side portions of the clip also having outer surfaces conforming to and engaging said spaced parallel and longitudinally extending side members, and brazing material securing each of said members to the conforming portions of the clip.

2. In a brazed joint for securing the side surfaces of two substantially coplanar and adjoining frame tubes to side tubes disposed in opposed relationship adjacent opposite sides of the frame tubes, the combination comprising a metal clip-type insert having side portions and a connecting portion integral with the side portions, said side portions each having opposed inner surfaces shaped to conform to side portions of the frame tubes and outer surfaces shaped to conform to portions of said side tubes, and brazed joints between each of said tubes and the conforming surfaces of said insert.

FRANK W. SCHWINN.

REFERENCES CITED

The following references are of record in the file of this patent:

UNITED STATES PATENTS

| Number | Name | Date |
|---|---|---|
| 474,584 | Tobey | May 10, 1892 |
| 679,082 | Latta | July 23, 1901 |
| 793,958 | Richardson | July 4, 1905 |
| 1,651,891 | Hodges | Dec. 6, 1927 |
| 1,823,028 | Caldwell | Sept. 15, 1931 |
| 2,117,107 | Soderberg | May 10, 1938 |
| 2,151,533 | Schwinn | Mar. 21, 1939 |

FOREIGN PATENTS

| Number | Country | Date |
|---|---|---|
| 536 | Great Britain | 1910 |
| 581,481 | France | Nov. 29, 1924 |
| 226,058 | Switzerland | Mar. 15, 1943 |